W. B. DAY
Nov. 24, 1931. AUTOMATIC REFRIGERATING SYSTEM Re. 18,263
Original Filed Dec. 15, 1927
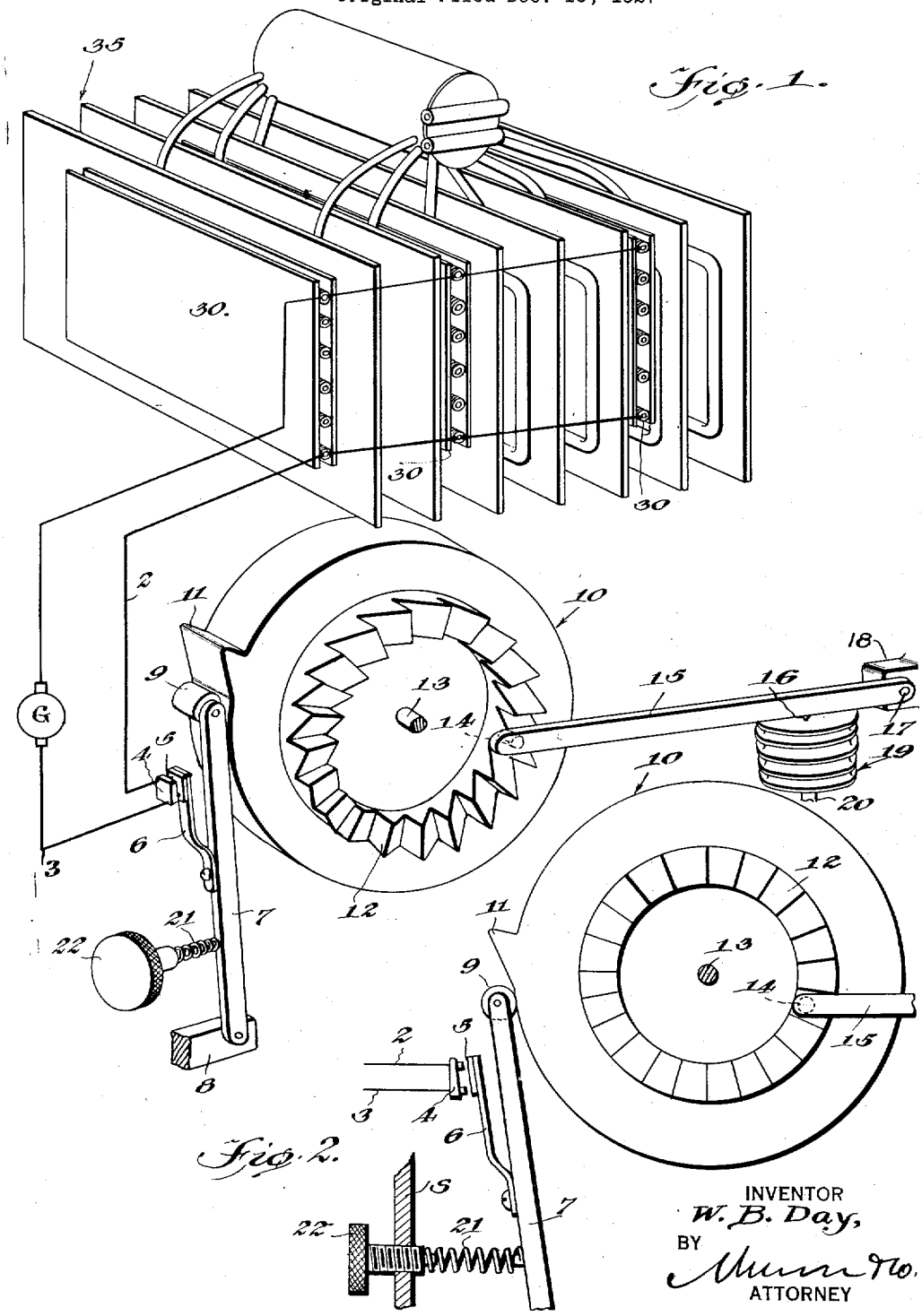
INVENTOR
W. B. Day,
BY
Munn & Co.
ATTORNEY Reissued Nov. 24, 1931

Re. 18,263

UNITED STATES PATENT OFFICE

WILLIAM B. DAY, OF LEXINGTON, KENTUCKY, ASSIGNOR, BY DIRECT AND MESNE ASSIGNMENTS, TO JOHN S. McCARTHY, OF WEEHAWKEN, NEW JERSEY

AUTOMATIC REFRIGERATING SYSTEM

Original No. 1,742,062, dated December 31, 1929, Serial No. 240,256, filed December 15, 1927. Application for reissue filed March 9, 1931. Serial No. 521,320.

The present invention relates to refrigeration and particularly to defrosting of the cooling element or unit of a refrigerating system.

In refrigeration systems wherein the cooling element or unit is placed in the path of a circulating medium, such as for example air, which is to be cooled, part of such medium freezes on such element and after a time this ice or frost becomes so thick as to impair refrigeration of the medium and renders the refrigeration system inefficient.

One of the objects of this invention is to provide a method and means for increasing at times the temperature of the refrigerating element above normal so as to melt the frost or ice therefrom and more generally to accomplish this while maintaining the flow of such medium over the cooling element.

More specifically it is an object of this invention to provide for the application and control of artificial heat to the cooling element for defrosting same.

It is a further object to automatically initiate the increasing of the temperature of the cooling element. In carrying out this object, it is a further object to provide a device which operates at intervals for causing the temperature of the cooling element to be increased from normal at intervals.

In carrying out these objects, the invention is susceptible of a wide range of modification without departing from the spirit or sacrificing any of the advantages of the claimed invention; there being shown in the drawings for illustrative purposes a preferred and practical form, in which Fig. 1 represents a perspective of an electric heater control constituting a preferred form of the invention, parts being broken out and in section; and Fig. 2 is a side elevation thereof.

The form of the invention described and shown herein for the purpose of illustration comprises an electric heat closure 1, the wires 2 and 3 from which lead two heating coils 30, which are connected in series and arranged in contact with the refrigerating surface of the cooling unit or element 35 of a refrigerating plant, and which, when in operation melt off the frost and ice from the unit. The contact 4 of this circuit closer is fixed while the contact 5 which cooperates therewith is movable and is carried by a spring arm 6 mounted on a lever 7 fulcrumed at one end to a laterally extending bracket 8 carried by a suitable supporting structure. At the free end of the lever 7 is a roller 9 which is arranged in the path of the periphery of a rotatably mounted wheel 10 having a radially extending cam 11 on the periphery thereof which is designed to engage the roller 9 during the rotation of the wheel and force the lever 7 toward contact 4 thereby causing the contact 5 carried by said lever to engage the contact 4 and close the electric circuit, sending current through the wires 2 and 3 to the heating coils above described.

The wheel 10 has an annular series of ratchet teeth 12 on one face thereof and is rotatably mounted on a suitable shaft 13. A pawl 14 is positioned to engage the teeth and is carried at one end of an arm 15 pivotally mounted at 17 on a supporting structure 18. This arm 15 has depending therefrom a pointed prong 16 which is arranged in contact with sylphon bellows 19 which is controlled by a vacuum from the refrigerating compressor (not shown) with the pipe 20 leading to said compressor. This device is shown in connection with what is known as the flooded system which has a boiler in the refrigerator and is part of the coil and maintains a quantity of sulphur dioxide or other suitable refrigerant, the height of which is controlled by a float valve, (not shown). It is understood that the function of the float valve in the header of the evaporator is to prevent the level of the liquid refrigerant from rising above a certain height. When the pressure within the evaporator, which is the suction pressure, falls below a minimum the bellows here shown at 19 which is connected by the pipe 20 with the evaporator, will have contracted sufficiently to open the motor switch and also to pull down the lever 15 to the point where the pin 14 will engage behind another notch 12 of the wheel 10. The number of teeth 12 on the gear wheel 10 determine how long will be required before the circuit closes on the heated coils. When the lever is down it will so remain until the bellows again expand which in turn causes the lever 15 to operate to turn the gear wheel another tooth. No defrosting, however, takes place until the wheel 10 makes one complete revolution, being slowly turned by the actuation of one notch at a time. It will thus be seen that if the wheel 10 has 24 teeth and if for example the refrigerating apparatus completes a cycle each hour, it will defrost once in twenty-four hours for a few minutes and then move away from the contact which closes the circuit for operating the electric heating coils. It will be understood that as the bellows 19 expands and contracts the lever 15 will be actuated and thereby rotate the wheel 10 by engagement of the pawl 14 with the teeth 12 of said wheel. It will thus be seen that the rotation of the wheel 10 of course causes the cam 11 to revolve and when said cam contacts the roller 9 it forces the lever 7 on which the roller is mounted away from the wheel, thereby causing the contact 5 of the circuit closer to engage the contact 4 and close the circuit and supply sufficient heat to the coils 30 to cause them to melt off the frost on the cooling units 35.

A coiled spring 21 is arranged between the lever 7 and an adjusting screw 22 mounted in the support S and is designed for controlling the engagement of the roller 9 with the periphery of the wheel 10, the wheel being made easier or harder to turn by adjusting the screw 22 for varying the tension of the spring 21 which opposes the bellows 19 to any desired degree.

From the above, it will be obvious that this controlling device is automatic and through the circuit closer 1 the heat will be applied intermittently to the cooling units 35 for a short period of time, sufficient to melt the ice and frost which may accumulate thereon, in so many running hours of the machine.

From the above description, it will be obvious that after this device is once connected up with the refrigerating machine, no further attention is necessary, and it will automatically apply and cut-off heat at predetermined intervals controlled by the number of teeth 12 on the ratchet wheel.

A defrosting device which will cause an increase in temperature from normal of the cooling element and which will cause the element to defrost in a few minutes is particularly useful in connection with freezer controls or cases in which freezing temperatures are maintained for the foods or articles stored therein since by applying heat which will cause defrosting in a few minutes, the increase in temperature of the food storage part will be negligible and therefore defrosting can take place without heating the foods to their melting point.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

I claim:

1. The combination with a refrigerating coil, of an electric heating coil arranged in close proximity thereto, and automatically operated means for energizing said heating coil at intervals whereby the refrigerating coil is freed from snow and ice.

2. The combination with a refrigerating coil, of an electric heating coil arranged adjacent thereto, and automatically operated means for energizing said heating coil at predetermined intervals whereby the refrigerating coil is freed from ice and snow.

3. The combination with a refrigerating machine including a coil and a compressor; of an electric heating coil arranged adjacent said refrigerating coil, an electric circuit controlling said heating coil, and automatically operated means for opening and closing said circuit whereby the electric coil is energized at intervals and the ice and snow formed on the refrigerating coil melted thereby.

4. The combination of a sylphon bellows adapted to be actuated by a refrigerating compressor, normally open electric contacts, and means operated intermittently by said bellows for closing said contacts.

5. Means for closing an electric circuit comprising normally open electric contacts, a lever on which one of said contacts is mounted, a roller carried by said lever, a cam wheel mounted to engage said roller to operate said movable contact into engagement with the fixed contact at predetermined intervals, a pawl and ratchet mechanism for operating said wheel, and suitably operated bellows for actuating said ratchet mechanism.

6. The combination of a sylphon bellows adapted to be actuated by pressure in the suction side of a refrigerating pump, a pawl carrying lever having engagement with said bellows and adapted to be operated thereby, a ratchet wheel having teeth located in the path of said pawl whereby the wheel is operated, a cam carried by the periphery of said wheel, normally open electric contacts, a lever on which one of said contacts is mounted and having a roller positioned for engagement by said wheel cam for intermittently closing the contacts when said roller is so engaged.

7. The combination of a sylphon bellows adapted to be actuated by pressure in the suction side of a refrigerating pump, a pawl carrying lever having engagement with said bellows and adapted to be operated thereby, a ratchet wheel having teeth located in the path of said pawl whereby the wheel is operated, a cam carried by the periphery of said wheel, normally open electric contacts, a lever on which one of said contacts is mounted and having a roller positioned for engagement by said wheel cam for intermittently closing the contacts when said roller is so engaged, and means for controlling the tension of the lever to vary the frictional engagement of the roller with the wheel.

8. In a refrigerating system, in combination, a cooling element placed in the path of air for cooling such air flowing thereover, said element being maintained normally at a temperature at which moisture from said air collects and freezes thereon to form a coating of frost, an artificial heating element secured in heat transfer relationship with said cooling element, and means for controlling said heating element for defrosting said cooling element.

9. In a refrigerating system, in combination, a cooling element placed in the path of air for cooling such air flowing thereover, said element being maintained normally at a temperature at which moisture from said air collects and freezes thereon to form a coating of frost, an artificial heating element secured in intimate metallic contact with said cooling element, and means for controlling said heating element for defrosting said cooling element.

10. In a refrigerating system including control apparatus and wherein the cooling element thereof is utilized for cooling a circulating medium flowing thereover and in which the element is maintained at a temperature at which a part of such medium freezes thereon, the method of defrosting said element which consists in applying artificial heat to said element automatically in accordance with a certain operation of the system to melt the frost from said element.

11. In a refrigerating system including control apparatus and wherein the cooling element thereof is utilized for cooling a circulating medium flowing thereover and in which the element is maintained at times at a temperature at which part of such medium freezes thereon, the method of clearing the frozen material from said element which consists in automatically initiating application of artificial heat to melt the frozen material in response to a certain normal operation of the system and then returning the system to normal operation after the defrosting operation.

12. In a refrigerating system including control apparatus wherein the cooling element thereof is utilized for cooling a circulating medium flowing thereover and in which the element is normally maintained at a temperature causing the solidification of part of said cooling medium thereon, the method of clearing the solidified material from the cooling element which consists in applying heat to said cooling element and then stopping the application of such heat automatically in response to increase in temperature.

13. In combination with a refrigerating system, including control apparatus a cooling element normally maintained at a temperature at which part of the fluid cooled thereby freezes thereon, said control apparatus including means for initiating a temperature condition of the cooling element higher than normal to clear the frozen material therefrom and means operated automatically in accordance with a predetermined normal operation of the system for actuating said initiating means.

14. A refrigerating system, comprising in combination, including control apparatus a cooling element normally maintained at desired refrigerating temperatures, said control apparatus including means operated automatically in accordance with a predetermined normal operation of the system for modifying the temperature of the cooling element, and including means operating automatically after a predetermined modified operation for rendering the first means ineffective.

15. A refrigerating system, comprising in combination, a cooling element normally maintained at desired refrigerating temperatures, means rendered operable automatically at intervals by the normal operation of the system for modifying from normal the temperature of the cooling element.

16. A refrigerating system, comprising in combination, a cooling element normally maintained at desired refrigerating temperatures, means rendered operable automatically at intervals by the normal operation of the system for increasing from normal the temperature of the cooling element.

17. A refrigerating system, comprising in combination, a cooling element normally maintained at a temperature at which a part of the fluid cooled thereby freezes thereon, a heating circuit for influencing the temperature of the cooling element, and means responsive to the pressure in the system for rendering the heating circuit effective whereby the element will defrost.

18. A refrigerating system, comprising in combination, a cooling element normally maintained at a temperature at which a part of the fluid cooled thereby freezes thereon, a heating circuit for influencing the temperature of the cooling element, means operated progressively by changes in pressure in the system, means actuated by said first means after a predetermined progressive operation thereof for rendering the heating circuit effective whereby the element will defrost, and means operating automatically after the heating circuit is effective for a time for rendering said heating circuit ineffective whereby the cooling element will return to its normal temperature.

19. A refrigerating system, comprising in combination, a cooling element normally maintained between a predetermined high temperature and a predetermined low temperature, means for initiating a modified temperature of the cooling element, and means responsive to said changes in temperature of the cooling element for controlling said initiating means.

20. A refrigerating system, comprising in combination, a cooling element normally maintained between a predetermined high temperature and a predetermined low temperature, means for initiating a modified temperature of the cooling element, means movable in response to said changes in temperature of the cooling element and means actuated by said movable means and responsive after a predetermined number of temperature changes during normal operation of said cooling element for initiating a modified temperature of the cooling element.

21. A refrigerating system, comprising in combination, a cooling element normally maintained at a temperature at which a part of the fluid cooled thereby freezes thereon, a heating circuit for influencing the temperature of the cooling element, and means operated in response to changes in temperature of the cooling element for rendering the heating circuit effective whereby the element will defrost.

22. A refrigerating system, comprising in combination, a cooling element normally maintained at a temperature at which a part of the fluid cooled thereby freezes thereon, a heating circuit for influencing the temperature of the cooling element, means operated progressively in response to changes in temperature of the cooling element, means actuated by said first means after a predetermined progressive operation thereof for rendering the heating circuit effective whereby the element will defrost, and means operating automatically after the heating circuit is effective for a time for rendering said heating circuit ineffective whereby the cooling element will return to its normal temperature.

23. In a refrigerating system wherein the cooling element thereof is utilized for cooling a circulating medium flowing thereover and in which the element is maintained normally at a temperature at which a part of such medium freezes thereon, the method of clearing such frozen medium from the element which consists in causing an increase from normal of the temperature of the cooling element and controlling the starting of such modified operation automatically in accordance with the normal operation of the system.

24. In a refrigerating system wherein the cooling element thereof is utilized for cooling a circulating medium flowing thereover and in which the element is maintained normally at a temperature at which a part of such medium freezes thereon, the method of clearing such frozen medium from the element which consists in causing an increase from normal of the temperature of the cooling element and controlling the starting of such modified operation automatically in accordance with the normal operation of the system and the returning to normal operation for maintaining normal temperature of the cooling element and controlling such return in accordance with a predetermined modified operation.

25. In a refrigerating system wherein the cooling element thereof is utilized for cooling a circulating medium flowing thereover and in which the element is maintained normally at a temperature at which a part of such medium freezes thereon, the method of clearing such frozen medium from the element which consists in causing an increase from normal of the temperature of the cooling element and controlling the starting of such modified operation automatically in accordance with the normal operation of the system and the returning to normal operation for obtaining normal temperature of the cooling element and controlling such return in response to a predetermined modified high temperature of the cooling element.

26. In a refrigerating system including control apparatus and wherein the cooling element thereof is utilized for cooling a circulating medium flowing thereover and in which the element is maintained for sustained periods at a temperature at which a part of such medium freezes thereon, the method of clearing such frozen medium from the cooling element which consists in causing a rise in temperature of the cooling element above the freezing temperature of said part and controlling the starting of such rise in temperature automatically in accordance with the normal operation of the system.

27. A refrigerating system including control apparatus, a cooling element maintained for sustained periods at a temperature at which a part of the medium cooled thereby freezes thereon, said control apparatus including means for causing an increase in temperature of the cooling element above the freezing temperature of said part and including means for automatically controlling the operation of said first means in accordance with the normal operation of the system whereby to automatically clear at intervals such frozen medium from the cooling element.

In testimony whereof I hereto affix my signature.

WILLIAM B. DAY.